March 10, 1959　　　K. MEYER　　　2,876,491
GRANULATING OR PELLETING DISCS
Filed June 17, 1957
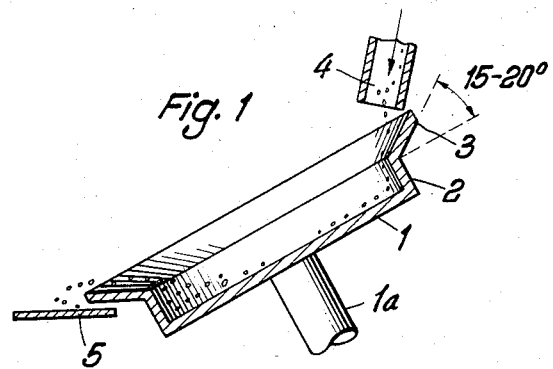
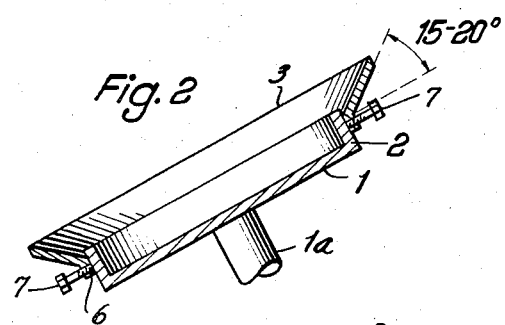
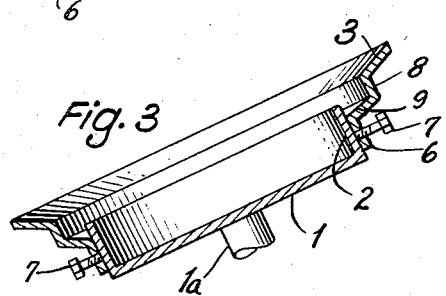
Inventor:
Kurt Meyer
By Briley, Stephens & Huettig
ATTORNEYS

United States Patent Office 2,876,491
Patented Mar. 10, 1959

2,876,491
GRANULATING OR PELLETING DISCS

Kurt Meyer, Frankfurt am Main, Germany, assignor to Metallgesellschaft Aktiengesellschaft, Frankfurt am Main, Germany Application June 17, 1957, Serial No. 666,008
Claims priority, application Germany June 30, 1956

4 Claims. (Cl. 18—1)

This invention relates to apparatus for granulating or pelleting.

Inclined rotary granulating discs are generally used for the granulation or pelleting of pulverulent or finely granular material. These discs have a surrounding damming edge set at an angle of 90° to the plane of the disc.

Granulating apparatus are also known in which the damming edge is provided with an annular channel, so-called powder trough. If the rotary disc and the channel are charged with different materials, granules form whose core consists of a different material from the shell.

If the material to be worked up is sensitive to pressure or shock, the pellets must be transferred from the disc to other transport devices in such a manner that they are not damaged.

Since the known granulating discs have damming edges or walls which are set at an angle of 90°, such discs are unsuitable for material which is sensitive to pressure and shock.

The present invention aims at providing an apparatus which permits the discharge of even very sensitive material from the granulating disc without breakage.

To this end, the granulating apparatus according to the invention consists of a rotary inclined disc from the damming edge of which a collar extends outwards and is inclined to the plane of the granulating disc at an angle of 5 to 20°, preferably 10 to 15°. The pellets roll over this collar, without having to fall from any appreciable height, on to a conveyor band, for example.

The principle of the invention may also be applied to granulating discs having two damming edges and an annular channel formed between the two damming edges, in which case the collar would be disposed on the outer wall of the annular channel.

According to one embodiment of the invention, the inclined portion of the collar can be arranged so that it is axially adjustable in relation to the disc.

The principle of the invention is furthermore applicable to granulating discs having an adjustable damming edge or wall.

In order to enable the invention to be more readily understood, reference is made to the accompanying drawings which illustrate diagrammatically and by way of example, three embodiments thereof in vertical section.

Figure 1 is a cross-sectional view through a granulating apparatus including the granulating disc of this invention;

Figure 2 is a cross-sectional view through a modified form of granulating disc; and Figure 3 is a cross-sectional view through another modified form of granulating disc.

In Figure 1, the granulating disc has a substantially flat circular bottom 1 and a cylindrical wall or damming edge 2. Extending radially outward from the upper edge of wall 2 is a collar 3 which is inclined to the plane of disc 1 at an angle ranging from about 15 to 20°. The disc is rotated by shaft 1a. Material flows through chute 4 into the disc, and the pellets are discharged over the lowest portion of collar 3 onto a conveyor 5.

In Figure 2, collar 1 is formed with a sleeve 6 which is telescoped over wall 2. Sleeve 6 is adjustably secured to wall 2 by means of set screws 7.

In Figure 3, collar 3 has a cylindrical wall 8 of greater diameter than wall 2, and a circular flange 9 joined to sleeve 6, thus forming a channel or powder trough between wall 2 and collar 3. Coating material is placed in this channel so that pellets discharged over wall 2 are coated with a different material before they are discharged from collar 3. Sleeve 6 is adjustably positioned on wall 2 by means of set screws 7.

About 20 tons of magnesite concentrate, 70% of which has a grain size of 325 mesh and which has a moisture content of about 12%, are charged per hour on to a granulating disc of the type illustrated in Figure 1. The disc has an internal diameter of 5 metres, is inclined at an angle of about 48° to the horizontal and rotates at about 4 to 4.5 revolutions per minute. The damming edge or wall 2 of the disc is 40 to 80 centimetres in height and the collar 3 is 50 to 70 centimetres wide. The material collects in a pocket formed between the bottom and the side edge or wall of the disc. Were the granulating disc to operate without collar, the pellets would drop a distance of about 50 centimetres from the top of the edge or wall on to the conveyor band 5. As, however, the mechanical strength of the pellets in fresh state is low, they could not withstand such a drop without sustaining damage. The advantage of the collar 3 is therefore apparent as the conveyor band 5 can be raised until it is directly below the edge of the collar, so that the pellets only have to drop from a minimum height of about 5 to 10 centimetres.

Moreover, another advantage of the collar 3 is that, while the coarser pellets having to a great extent a uniform diameter pass off the collar on a relatively restricted zone, smaller pellets and material which has not been formed into pellets are carried along in upward direction on the collar until they again drop back on to the disc. The pellets carry out a continuous rolling movement on the collar, their mechanical strength being thereby increased from about 2 lbs. to 2½ to 3 lbs. At the same time the material can also be sorted into pellets of the same diameter and possibly entrained fragments as well as residue material which has not been converted into pellets.

The diameter of the granules delivered is from ½ to 1½ inches.

I claim:

1. A granulating apparatus comprising a rotatable inclined disc having a circular bottom, a peripheral wall around said bottom, a collar extending radially outwardly from said wall for receiving pellets from said disc, discharging large pellets from the outer edge of said collar, and returning small pellets to said disc, and said collar being inclined at an angle from 5 to 20° upwardly from the plane of the bottom of the disc to position the outer circumference of said collar above the edge of said wall.

2. A granulating apparatus as in claim 1, further comprising adjustable means for mounting said collar on said disc.

3. A granulating apparatus as in claim 1, further comprising a sleeve connected to said collar and telescoped on said wall.

4. A granulating apparatus as in claim 1, further comprising a sleeve telescoped on said wall, and channel means joined between said sleeve and said collar.

References Cited in the file of this patent
UNITED STATES PATENTS 2,726,959     Lushbough et al.     Dec. 13, 1955

FOREIGN PATENTS 711,102     Great Britain     June 23, 1954
915,072     Germany     June 3, 1954